B. ROSING.
ART OF ELECTRIC TELESCOPY.
APPLICATION FILED APR. 5, 1911.
1,161,734.
Patented Nov. 23, 1915.
4 SHEETS—SHEET 1.
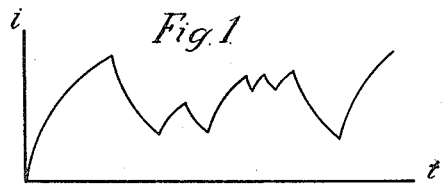
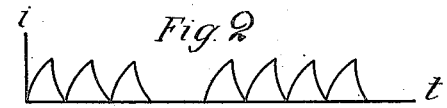
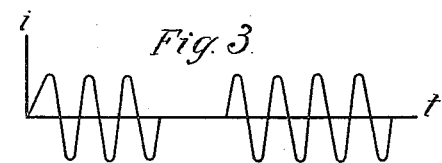
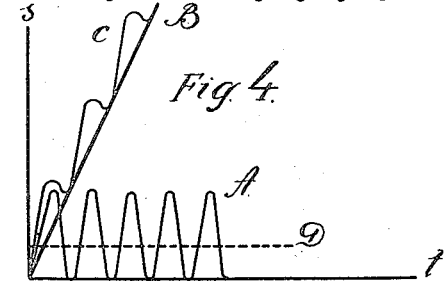
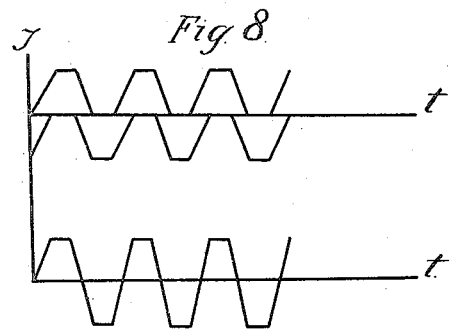
Witnesses:
E. O. Hildebrand
A. L. Crockett
Inventor:
Boris Rosing,
by
his Attorney B. ROSING.
ART OF ELECTRIC TELESCOPY.
APPLICATION FILED APR. 5, 1911.
1,161,734.
Patented Nov. 23, 1915.
4 SHEETS—SHEET 2.
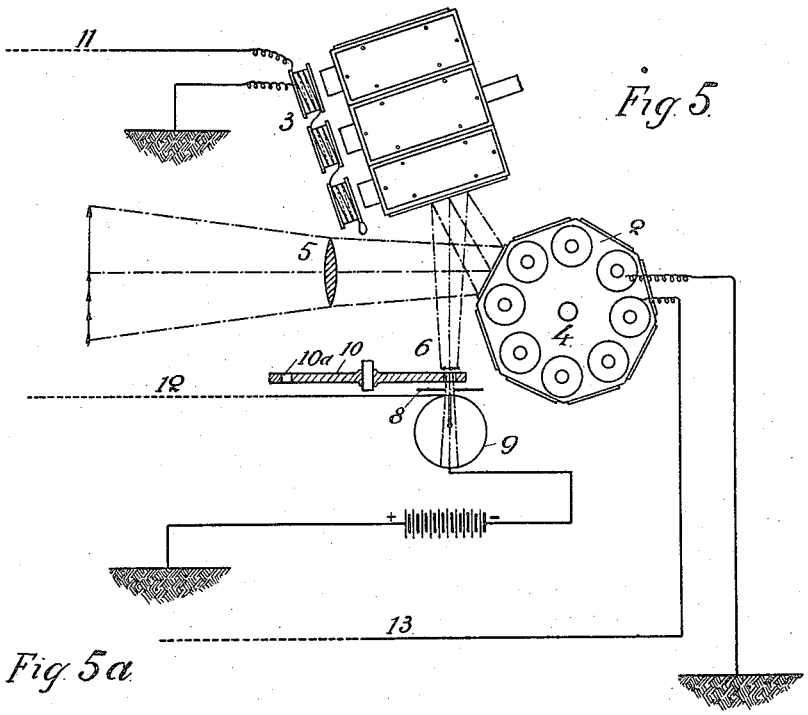
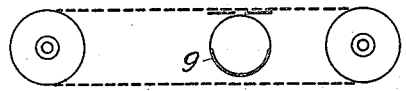
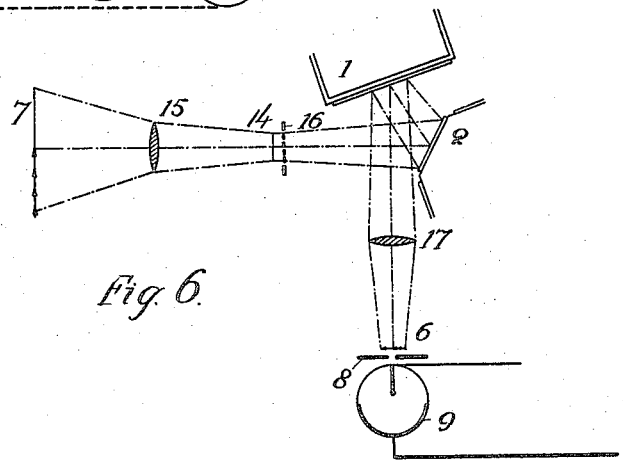

B. ROSING.
ART OF ELECTRIC TELESCOPY.
APPLICATION FILED APR. 5, 1911.

1,161,734.

Patented Nov. 23, 1915.
4 SHEETS—SHEET 3.

Witnesses:
E. O. Hildebrand
A. L. Crockett

Inventor:
Boris Rosing,
by his Attorney.

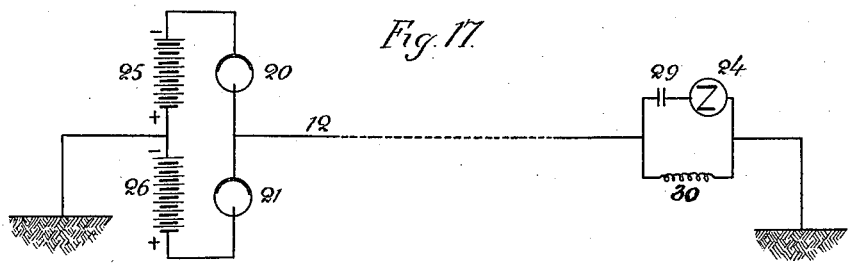
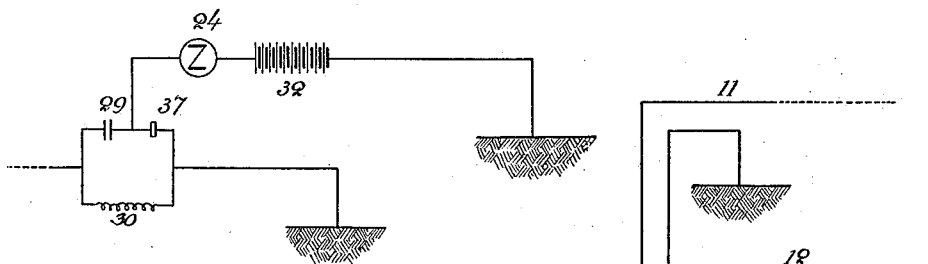
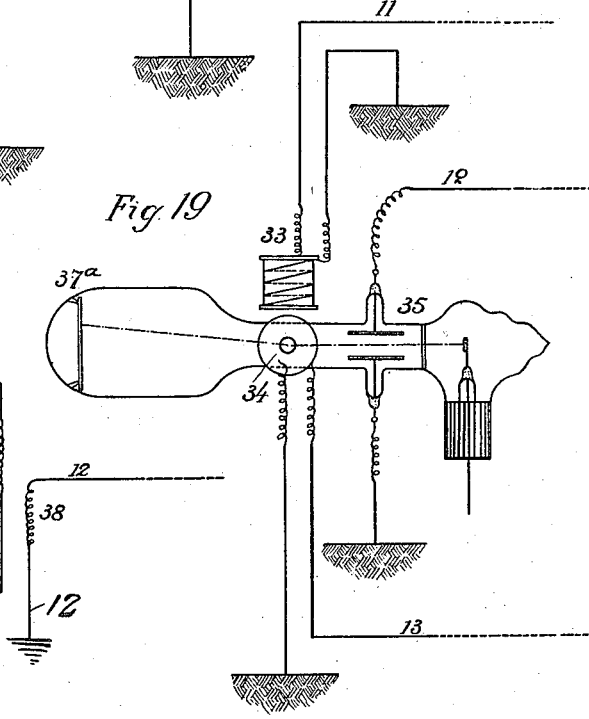
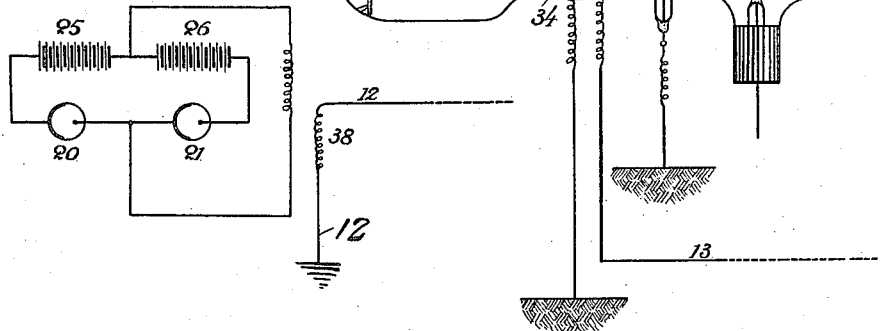

UNITED STATES PATENT OFFICE.

BORIS ROSING, OF PETROGRAD, RUSSIA.

ART OF ELECTRIC TELESCOPY.

1,161,734.                Specification of Letters Patent.        Patented Nov. 23, 1915.

Application filed April 5, 1911. Serial No. 619,166.

*To all whom it may concern:*

Be it known that I, BORIS ROSING, a citizen of the Russian Empire, residing at Petrograd, in the Russian Empire, have invented certain new and useful Improvements in the Art of Electric Telescopy; and I do hereby declare the following to be a full, clear, and exact description of the invention, such as will enable others skilled in the art to which it appertains to make and use the same.

Figure 9:
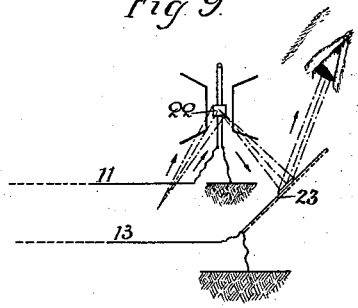
Figure 10:
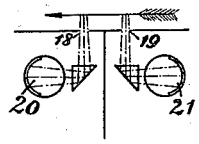
Figure 11:
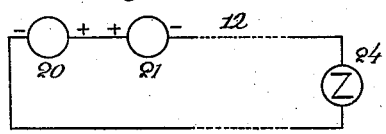
Figure 13:
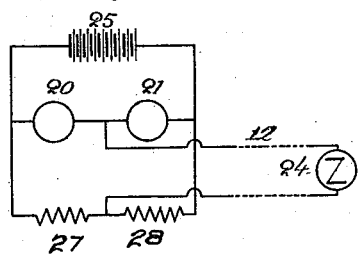
Figure 12:
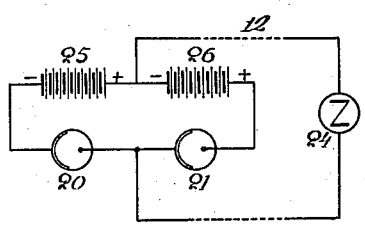
Figure 15:
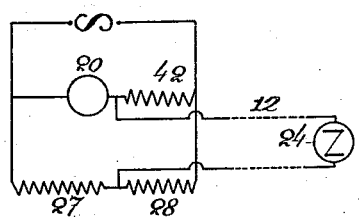
Figure 14:
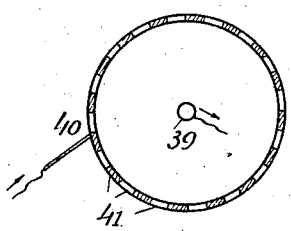
Figure 16:
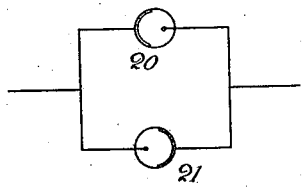

In the transmission by means of electrical telescopic and like apparatus of luminous pictures it is requisite in every case to effect the transmission, by means of electrical currents or charges, of a large number of light signals which as a rule are of unequal duration and follow each other at unequal intervals of time. Now the action upon these signals of the self induction and capacity of the different apparatus employed and of the circuit, as well as the inertia and electrical viscosity of the photo-electric transmitter and of the apparatus at the receiving station will vary in such a way that light signals of equal strength at the transmitting station give rise to impulses at the receiving station which are not only of unequal duration but are also of varying intensity, being either strengthened or weakened during transmission. In fact these impulses are, in the case of prolonged light signals, strengthened, and in the case of brief light signals, weakened by transmission. These disadvantages of the previously known devices and the manner in which I overcome the same by my invention will be clear from the description hereinafter when taken in connection with the accompanying drawings, in which, Figures 1 to 4 inclusive are diagrammatic views of current curves referred to hereinafter; Fig. 5 a diagrammatic view of a transmitting apparatus embodying certain features of my invention; Fig. 5ª a similar view of a modification of one part of the above; Fig. 6 a similar view of a modified form of my improved transmitting apparatus; Figs. 7 and 8 diagrams of current or voltage curves produced by the aid of photoelectric elements as employed by me; Fig. 9 a diagrammatic view of a pair of oscillographs used as a part of a receiving apparatus in accordance with my invention; Fig. 10 a similar view of a part of a transmitting apparatus embodying that feature of my invention in which two photo elements are employed; Figs. 11 to 13 inclusive are diagrams illustrating various forms of photo-electric circuit systems embodying my invention; Fig. 14 a detail sectional view of a rotary current interrupter employed by me in one modification of the apparatus; Figs. 15 and 16 diagrams illustrating other modified circuit systems which may be used with the photo electric elements; Fig. 17 a diagram of still another form of circuit system for the photo electric current; Fig. 18 a detail diagrammatic view of a modified circuit system at the receiving end and for the photo electric current; Fig. 19 a similar view of one form of receiving apparatus employed by me in which a cathode tube is employed; Fig. 20 a diagram of a local transmission circuit showing another embodiment of my invention.

Fig. 1 of the accompanying drawings diagrammatically illustrates the dependence upon time of the strength of the current or of the charge in a long distance transmission wire when signals of unequal duration are transmitted. The curve consists of sections of curves having vertices of unequal height owing to the influence upon the impulses of the reactance of the conductors and apparatus. This diagram explains the hereinbefore described actions and shows in particular that intense but brief light signals stand out with less relief than signals of less intensity but of correspondingly longer duration and that brief signals can even be completely masked by signals which last longer and therefore can be made more apparent; the inevitable result being that the reproduction of the picture field to be transmitted is incorrect with respect to the distribution of light and shade. On the other hand the reaction involves a general weakening of the signals. Finally in electrical telescopic apparatus in which the transmission to a distance of the image is effected through common conductors and, consequently, the reproduction thereof at the receiving station is effected by means of a single apparatus by the movement of the signal in the field of view, the signals which appear as points will be visible in the form of more or less elongated lines, whereby the shorter signals especially will be greatly distorted and weakened. The improved method of transmission now to be described is intended to obviate the said disadvantages. The fundamental inventive idea of the improved method of transmission is founded upon a recognition of the fact that the transmission of the light signals must be effected through fluctuating, pulsating or alternating currents of constant frequency, that is, broadly speaking, by such vibratory currents as produce impulses of equal and very short duration at the receiving station, if the disadvantages diagrammatically illustrated by Fig. 1 are to be entirely eliminated. According to this invention, in order to reduce this fundamental idea to actual practice the light signals at the transmitting station are, prior to their action upon the photo-electric receiver, divided up by means of intervening dark intervals, into elementary signals of uniform duration, or the fluctuating current produced in the circuit of the photo-electric receiver by the action thereon of undivided light signals of varying duration is itself divided up into distinct elementary impulses of equal duration, or, finally there are employed directly in the circuit of the photo-electric receiver, instead of the usual sources of continuous current, current sources such as directly supply a pulsating or alternating current of the same voltage of constant high frequency, and of a definite—for example, a sinusoidal—form of curve.

The breaking up of the light signals into elementary signals of equal duration may, for example, be accomplished by erecting in front of the object the luminous picture of which is to be transmitted, or in front of a real image thereof obtained by a suitable objective or lens, a uniform grid or network of some suitable opaque material. Another means for effecting this purpose consists in subjecting the light-sensitive receiver, that is to say, the photo-electric element which is acted upon by the signals, to the action of light at equal intervals of time for periods of time which are likewise equal in duration and as small as possible, which may be done by periodically covering over or shutting up the aperture in the screen of the said receiver. In this way there is produced instead of the before mentioned functional curve, formed of parts of various heights, see Fig. 1, and showing the relation between time ($t$) and the strength of current ($i$), the curve shown by Fig. 2, the vertices of which are at equal heights above the time line $t$. The signals of equal intensity but of different duration differ in this case from each other only in respect of the number of vertices, the height of the vertices and consequently also the strength of the signals remaining constant throughout. By this means therefore the first named disadvantage is completely obviated.

The second disadvantage that is to say the influence of the reactance, as is well known, can not be completely obviated in the case of pulsating currents this, on the contrary, being possible only when simple sine currents are employed. The further development of the inventive idea consists therefore in the production in the circuit of the photo-electric receiver of a current which in like manner can be represented by a series of segments of equal altitude, but the vertices of which lie alternately above and below the time line $t$, the curve being consequently similar to the sine curve of a simple alternating current of a constant periodicity, see Fig. 3. According to this invention this can be effected for example by means of a photo-electric receiver comprising two photo elements instead of one as usual, these two photo elements being inserted in a special manner in an electrical circuit. In the transmission of the light signals by alternating currents produced in this way not only can the influences of the reactance be weakened, but other valuable properties also of the alternating currents can be utilized for the improvement of the transmission of the picture with great advantage. To weaken the influence of the reactance either the voltage resonance or the current strength resonance phenomena may be made use of with advantage according to the kind of photo-electric device employed at the transmitting station. The use at the receiving station for example, of an oscillatory circuit and of a detector in the manner known in spark or wireless telegraphy will serve admirably to increase the sensitiveness of the transmission.

In continuation of the fundamental inventive idea a second way of carrying out the improved method of transmission has been evolved according to which the light signals prior to their action upon the photo-electric receiver are not split up into elementary signals of equal duration but the current impulses of unequal duration due to the action upon this receiver of the undivided signals are themselves subdivided into single impulses of equal duration, such subdivision being effected by means of any suitable current interrupter.

Another method of carrying out the invention consists, as has already been mentioned, in the use of a pulsating or alternating current of suitable constant frequency. The reproduction at the receiving station of the transmitted picture field can in this case be effected by means and in a manner already well known; and in its broader aspects the invention is not to be understood as limited to any particular method of reproduction at the receiving station. The transmission of the signals by means of pulsating or alternating currents also permits however of improvements in the signal-reproducing devices at the receiving station. If for example a pencil of cathode rays be employed for this purpose, as described in the specification of British Letters Patent No. 27570 of 1907, granted to the applicant the necessity for a special screen for partially or wholly intercepting the cathode rays for the purpose of regulating the intensity of the signal at the receiving station (that is to say the luminous point on the fluorescent screen at said station) in accordance with the intensity of the light signals at the transmitting station (which intercepting of the rays is produced by the action of the before mentioned pulsating current or alternating currents), can be entirely dispensed with by so compounding the oscillating movement of the signal and the movement which is imparted to the same signal for the purpose of delineating (reproducing) the picture at the receiving station, that the time of action of the signal upon the eye of the observer corresponds to the intensity of the light signals at the transmitting station. Herein there is contained a further important development and an important practical application or utilization of the inventive idea because the above described method of reproduction of the picture at the receiving station by simple composition or addition of two mutual independent movements of the signal to be observed is inapplicable if signals which are not broken up into elementary signals of equal duration, are transmitted in the usual way. Fig. 4 will serve to explain these statements. If A be the curve of movement for the pencil of cathode rays of the signal transmitted thereby under the action of the pulsating currents or alternating currents at the transmitting station and if B be the distance which, as a function of the time, the same signal passes over in uniform motion for the purpose of delineating the field of the picture at said station, and if these movements relatively to a definite system of coördinates be compounded or added up, there will be obtained the curve C which, as, can be seen, consists alternately of steep sections corresponding to the rapid movements of the signal and less steep sections connecting them, corresponding to the slow movements of the signal.

By suitably regulating the speed of the uniform movement B it is always possible to make the inclination of the connecting section of the curve C to the axis of abscissæ $t$ practically equal to zero, that is to say to impart to the signal a resultant movement which, periodically, is practically or absolutely interrupted. During these pauses in the movement of the signal it naturally creates a much stronger impression on the eye than during its moments of rapid movement, and the field of view therefore appears to the observer as if composed of points of varying luminosity. The darker points can be rendered quite dark by using a screen which completely intercepts the signal that is to say holds it back or blocks it when it passes below a fixed limit in its oscillating movement A, for example below the line D, see Fig. 4. Such an addition or compounding of movements can also be made use of in the same way and with the same result if there be employed as a signal transmitting agent at the receiving station a pencil of light rays which is reflected by the movable mirror of an oscillograph or by the movable system of a string galvanometer, etc. In order, when employing this method of composition or addition, to fill up the field of view with points of varying illumination corresponding to the distribution of light in the field of the picture, it is only necessary so to select the speed of the movement B that the signal to be observed comes to a standstill only occasionally when the current impulses are strongest, that is to say on a curve A having its vertices at the maximum height because under such circumstances the signal will never come to rest when the current impulses are less that is to say are on curves A having vertices of reduced height, and are derived from less luminious points of the field of the picture, because the corresponding sections of the resulting movement curve C will always be more or less at an incline to the axis of abscissæ and will therefore act for a correspondingly shorter time and less intensely upon the eye. In the present method of reproduction of the picture transmitted from a distance to the receiving station, a circumstance which presents advantages is that the short signals appear as points of light and are not converted into lines in the field of view by the movement of the pencil of cathode or light rays, as in the known light picture reproduction methods. By this means the third disadvantage hereinbefore mentioned is also obviated. The difference between light signals lasting for different lengths of time consists in the heretofore known methods only in the fact that the shorter signals consist of fewer and the longer ones of a greater number of single points.

A special advantage of the improved method of reproduction consists in the fact that, as will be explained hereinafter, a reduction in the number of line wires employed between the transmitting and receiving stations can be effected.

To enable the invention to be clearly understood several ways of carrying out the new or improved method will now be described as applied to an electrical telescopic apparatus.

The transmitting station equipment illustrated in Figs. 5 and 6 is substantially similar to that described and shown in the specification of the applicant's said British patent.

1 and 2 are rotary polyhedral mirrors the axes of rotation of which are at right angles to each other and which are so connected by suitable intermediate driving gear that one mirror, the mirror 1 for example, rotates at several times the angular velocity of the other. The polyhedral mirrors carry the moving parts of current generators 3 and 4 respectively which supply an alternating current the frequency of which is equal to the product of the rate of rotation of the corresponding mirror and the number of the reflecting faces thereof. The result is that, the interval of time during which one face of the mirror moves into the place of another face thereof in space corresponds to a complete phase of the currents supplied by the corresponding generator.

It will be seen that each mirror device in the example illustrated in the drawings, Fig. 5, is in the general form of an octagonal drum, each face of the octagon carrying a reflecting or mirror surface. Each drum is arranged to rotate about its central axis. The mirror device 2 is so located with relation to the picture field 7, and the mirror device 1, and the axes of the two mirror devices 1 and 2 are so arranged transversely to each other, that at any given instant only one point of the picture field will be reflected so as to reach the photo electric element 9. This will be clear, when it is considered that one mirror of the slower moving mirror device 2 will reflect to a coacting mirror of the mirror device 1 the entire picture field but will move the reflected image lengthwise of the said coacting mirror of mirror device 1 so that said reflected image will appear to sweep along said coacting mirror. Since, however, there is only a certain line extending transversely of the length of the coacting mirror of mirror device 1 which can reflect along an axis passing through the slot which admits light to the photo electric device, it is obvious that as the quicker moving mirror device 1 rotates it will in turn at a given instant reflect only a given point in this transverse line to the opening to the photo electric device. Since, however, the mirror device 2 rotates and thus carries the image of the picture field lengthwise of the coacting mirror on the mirror device 1, every portion of the picture field will be carried across the said transverse coacting mirror, and as the mirror device 1 rotates more rapidly it will reflect each point of said line into the opening to the photo electric device. In this way, the picture field may be reflected point by point into the opening to the photo electric device.

The relative speeds of rotation of the mirror devices are such that the mirror device 1 will be able to reflect each point of the said transverse line of the image into the photo electric device before the mirror device 2 has moved enough to bring up the next line portion of the picture field. Since each mirror device is coupled to its own electric generator or magneto device, and each generator has its own circuit, it is clear that a series of waves of alternating current will be set up in each circuit, but the current in the circuit energized by the alternating generator coupled to mirror device 1 will have a much higher frequency than the current of the other circuit.

In a specific form of the invention, the action of the two currents at the receiving end may be combined, as will be clear from the description hereinafter, by employing each current to energize an electromagnet, the said magnets being at right angles to each other, so arranged that the resultant field acts upon a cathode ray which is arranged to act upon a fluorescent screen. Considering now the alternating field due to the current of lesser frequency, it will be clear that as this field changes from a maximum positive value to a maximum negative value, it will move the cathode ray a certain maximum amount in a given direction, and as the said magnetic field changes from its maximum negative value to its maximum positive value it will move the said cathode ray back to its first position. Thus the field due to the current of less frequency will give the cathode ray a vibrating motion in a certain plane. The current of greater frequency will produce an alternating field also of greater frequency than that of the one previously considered, and as the direction of this field is at right angles to the other, it will cause an oscillation of the ray in a plane at right angles to that of the field first discussed. And, owing to the higher frequency of the second field the cathode ray will vibrate in its direction from one side of the screen to the other and back again while said ray is traveling over a small portion of its path of vibration due to the field of lesser frequency. In this way the ray is caused to traverse the entire picture field of the fluorescent screen while the slower magnetic field is passing from a maximum positive to a maximum negative value and then to again traverse the said entire picture field in a reverse direction while the slower magnetic field is passing from its maximum negative value to its maximum positive value. The current generators on the polyhedral mirrors may naturally be replaced by rheostats included in the circuit of a source of direct current as is well understood. An arrangement of this kind is described in my copending application 619,165 of even filing date herewith.

By a knowledge of optics and of the rules relating to dynamo electric machines as well as by the statements set forth in prior patent specifications, see for example the specifications of German Patent No. 209320, and said British Patent No. 27570 of 1907, apparatus can readily be constructed which will answer to the requirements hereinbefore set forth. Among these requirements attention must be especially drawn to the fact that the current curves supplied by the generators or the rheostats substituted for them must at least at certain parts thereof indicate a current which varies proportionally to the angle of rotation of the corresponding mirror. The two mirrors 1 and 2 together with the lens 5 constitute the optical system at the transmitting station by which the real image 6 of the field of the picture 7 is obtained and so moved relatively to the screen or diaphragm 8 that the rays of light proceeding from the several points of the field of the picture successively illuminate the photo-element 9. Owing to the hereinbefore described dependence between the currents supplied by the generators or rheostats and the angular velocity of the polyhedral mirrors, the variations in the strength of the current will accordingly be always synchronous with the movements of the field of the picture which are effected by the corresponding mirror.

In front of the screen 8 or elsewhere in the path of the rays directed on to the photoelectric element 9 there is arranged according to the present invention a rapidly revolving disk 10 made of opaque material and having formed in it apertures 10ª arranged in a circular row around the axis of rotation. The disk 10 is so arranged that the apertures 10ª successively coincide with the aperture in the screen 8 and alternately allow the rays of light to fall upon the photo element 9 and again shut them off from it, for example, for the same given intervals of time. By means of this arrangement the light signals are consequently broken up into a number of periodically separated elementary signals of equal duration and the photo element 9 is influenced by these latter so that the current impulses produced in the photo-electric circuit are of like duration and of a strength which corresponds to the intensity of illumination or the brightness of the corresponding points in the field of the picture. The currents supplied by the generators 3 and 4 and the photo element 9 are transmitted, respectively, by means of conductors 11, 13, 12 and an earth return, to the receiving station and there utilized, in the usual way or by the proposed improved means, to effect the reproduction of the picture. The rotating disk 10 of Fig. 5 can be replaced by a suitably perforated endless band as shown in Fig. 5ª, which is passed over two or more rollers and rapidly moved by any well known means.

The only difference between the arrangement of the transmitting station equipment shown in Fig. 6 and that previously described with reference to Fig. 5 is that for breaking up the light signals a grid or grating 16 is placed in front of the real image 14 of the field of the picture to be reproduced, which image is produced in front of the system of mirrors 1 and 2 by the lens 15. The grid or grating 16 consists of parallel grid bars of opaque material running in such a direction that their image produced in front of the photo element by means of a second objective or lens 17 runs at right angles to the movement which is imparted to the image by the mirror rotating with the greater angular velocity. It will be understood that the mirrors at the transmitting station may be constructed otherwise than as shown and may be arranged to move in any other suitable way, the only important feature being to insure that the reflections of the individual portions of the field of view be successively sent through the aperture in the screen or diaphragm of the photo element and that the illumination thereof by the light signals be interrupted for constant small periods of time after short equal periods of illumination.

In the arrangements of the transmitting station hereinbefore described the photoelectric receiver can only produce pulsating currents. In order to produce in the circuit of this receiver an alternating current, which, as already explained, possesses very considerable advantages for the transmission of light pictures two photo elements are, according to the present invention, included in an electrical circuit in such a manner that the current impulses sent into the circuit thereby, on illumination, possess opposite directions of propagation and the illumination of the photo elements by the rays of light proceeding from one and the same point of the field of view is not effected simultaneously but successively. In order to effect this (periodically separated) method of illumination it suffices for example to arrange the apertures in diaphragm 8, through which the rays of light obtain access to the photo elements, adjacent to each other and alined, one behind the other in the direction in which the light signals are moved by the more quickly rotating mirror. If in this case the transmitting station equipment includes the arrangement shown in Figs. 5 or 5ª for breaking up the light signals into elementary signals, then the apertures 10ª in the disk or band 10 must be moved in the same direction as that in which the diaphragm apertures are alined. In this arrangement therefore the illumination curves of the two photo elements forming the photo-electric receiver will be shifted in phase.

By suitable choice of the size and shape of the apertures 10ª and of the apertures in the screen of the photo element very different forms can be given to these curves. Thus for example the form of curve shown in Fig. 7 will be obtained for a photo element when the apertures 10ª are of rectangular form and their width is equal to the distance between them while the aperture in the screen 8 is double that width and is likewise rectangular. Now since in the case of certain photo elements, for example those whose action is based upon discharge of current during illumination, the currents produced thereby vary proportionally to the intensity of the illumination, for this special case and with the above described connection of the two photo elements there will be obtained current curves which are exactly proportionate to the illuminating curves, but which extend on both sides of the axis of abscissæ and are displaced by half a period in the phase as shown at the upper part of Fig. 8. If the ordinates of these two curves be added together there will be produced the resultant current curve supplied by both photo elements which, as shown in the lower part of the same Fig. 8 very closely approximates to the sine curve of a simple alternating current.

Fig. 10 shows a construction of photo-electric receiver provided as described with two photo elements 20 and 21. In front of these elements are arranged prisms which deflect the rays passing through the apertures 18 and 19 on to the corresponding elements. The necessary connection of the elements 20 and 21 may be carried out in various ways, of which typical examples are given in Figs. 11, 12, 13, 17 and 20. It is to be understood that the photo elements 20 and 21 and apertures 18 and 19 correspond to and can be substituted for the simple photo element and aperture 8 of Figs. 5 and 6. Similarly, conductor 12 corresponds to the line 12 of Figs. 5 and 6 which transmits electrical impulses from the photo element 9 to the apparatus at the receiving station. This latter is not shown in Figs. 5 and 6, but is designated as 24 in Figs. 11, 12, 13 and 17, as well as in Figs. 15 and 18. In Figs. 11, 12, 13 and 15, the conductor 12 serves also as a return conductor for the transmitting line; while in Figs. 17, 18 and 20, as also in Fig. 5, the return is through the earth. The scheme of connections is simplest for photo elements the action of which is based upon the Becquerel phenomenon (the variation of the electromotive force of the element under the action of light see page 38 of Liesegang's *Beitrage zum Problem des Elektrischen Fernschen's* 1891).

In such case, (see Fig. 11), the elements 20 and 21 at the sending station and the signaling apparatus 24 at the receiving station are connected up in series in the circuit, but in the arrangement under notice the connections will be such that the photo elements have their poles of like sign turned toward each other.

When photo elements are employed the action of which is based upon the discharge of the negative electricity under the action of light, (the Hallwachs phenomenon p. S. Dr. Chr. Ries "*Das Licht in Seinen Elektrischen und Magnetischen Wirkungen*" 1909), the scheme of connections shown in Fig. 12 can be employed, in which 25 and 26 are two batteries of equal strength connected in series, in the circuits of which the photo elements 20 and 21 are so placed that the light-sensitive poles of both are turned toward the cathodes or negative poles of the sources of current. The signaling apparatus 24 at the receiving station is in this arrangement placed in a bridge between the two sources of current 25 and 26 and the photo elements 20 and 21. Under the influence of the alternate illumination of the photo elements 20 and 21 the batteries 25 and 26 will be alternately discharged across one or other photo element, and by the branch or shunt arrangement shown, current impulses in opposite directions will be impressed upon the apparatus 24 at the receiving station, such impulses producing an alternating current in such branch or shunt.

The scheme of connections is the same as shown in Fig. 12 if photo elements be used the action of which is based upon the variation of the electrical resistance by illumination. The action of the apparatus in such case is based on the fact that with alternate illumination of the photo elements 20 and 21 the consequent voltage or tension drops in the photo-electric circuit mains on both sides of the bridge alternately decrease and thereby produce fluctuations or alternating variations from the normal or average tension in the bridge or shunt itself. The scheme of connections shown in Fig. 12 can be modified as shown in Fig. 13 by including in parallel with the circuit of the photo elements 20 and 21 a conductor with two resistances 27 and 28 and joining the bridge or shunt, of the apparatus 24, after the manner of a Wheatstone bridge to the central points of the two parallel branches. When, according to another method of transmission according to this invention, instead of breaking up the light signals themselves into separate elements, the photo-electric current produced is converted into current impulses of equal duration separated by pauses of equal length, it is an advantage to employ a current interrupter in the form of a rotating disk 39, (Fig. 14), having insulating strips 41 on its periphery, against which there bears a brush 40. If in the circuit of the photo elements, instead of the ordinary sources of continuous currents there be inserted sources of pulsating or of alternating current, it is not necessary to employ two photo elements connected up as shown in Figs. 12 and 13. In other respects however the scheme of connections can be after the manner of a Wheatstone bridge as hereinbefore described in order to only produce a current in the signaling apparatus at the receiving station when the photo elements are actually illuminated. Fig. 15 illustrates a suitable scheme of connections of this kind, in which ω designates a source of alternating current. In place of the second photo element 21 shown in Fig. 13, a non-inductive or an inductive resistance 42 is inserted. Since the check-valve action peculiar to these photo elements is based upon the discharge of negative electricity under the influence of light that is to say according to the Hallwachs phenomenon, it is necessary, if an alternating current is to be produced in the circuit of the signaling apparatus 24, that two such elements should be arranged in parallel in the photo-electric circuits in such a way that the current traversing the circuit meets with poles of the elements of opposite sign, as illustrated in Fig. 12. The photo element 20 of Fig. 15 may be replaced by two elements 20 and 21 connected in parallel as shown in Fig. 16.

As before stated, the arrangement at the receiving station, as far as the signal indicating apparatus is concerned may be of the type already commonly employed. As a signal indicating apparatus a pencil of cathode rays may be employed in the manner described in the specification of the applicant's said prior patent or a pencil of light rays may be used behind a screen said light pencil being influenced by the signaling currents sent out through conductor 12 from the transmitting station, and the only improvement therein according to this invention is that the controlling currents are pulsating signaling currents, or alternating signaling currents of short and always constant duration of action, which are obtained by the breaking up of the light signals themselves or of the signaling currents obtained therefrom into elements in the manner hereinbefore described; or by the application in the signaling current circuit of sources of current which supply pulsating or alternating currents of suitably constant periodicity. With regard however to the other apparatus which is unavoidably necessary at the receiving station of every electrical telescopic installation having only one signal reproducing apparatus, namely the apparatus which has to move the signal ray in a continuous path in the field of view of the observer synchronously and proportionately to the movement of the illuminating signaling rays at the transmitting station, it is now proposed to use for this purpose an optical system consisting of two oscillographs fitted with movable mirrors, which are operated by currents that vary synchronously with the movements of the mirrors of the optical system at the transmitting station. When such a system is used at the transmitting station, the axes of rotation of the mirrors 22 and 23 of the two oscillographs at the receiving station, see Fig. 9, are arranged at right angles to each other and the mirrors are so rotated at the place at which the signal appears, that the rays proceeding therefrom pass after reflection from both mirrors into the field of view of the observer or on to a screen. The currents produced as before stated by the optical system at the transmitting station pass along the conductors 11 and 13 to influence the oscillographs and move their mirrors in such a way that the signal or its real or virtual image is moved in the field of view synchronously and proportionately to the movements executed over the field of the original view with respect to the aperture in the screen of the photo-electric receiver. Now as the intensity of the signal varies in conformity with the intensity at any particular time of the illumination of the photo element at the receiving station, the hereinbefore described movement of the signal at the receiving station will reproduce a copy of the field of the picture which is correct with respect both to form and to illumination. It should be noted that this reproduction appears as composed of single points which are somewhat elongated in the direction in which the signal executes the more rapid component of its movement.

Attention has already been drawn to the fact that in the improved method of transmitting light signals it is possible to accurately reproduce the signal as regards intensity of illumination without any intercepting diaphragm by simply compounding the vibrations of the signal with its particular displacement movement at any time in the field of view. For this purpose it is sufficient to bring the direction in which the luminous signal point executes its vibrations and the direction of the more rapid of the two components of the movement imparted to the signal for the purpose of delineating the picture in the field of view of the observer, more or less accurately into coincidence and to adjust in a suitable manner the speeds of the movements to be compounded. If for example the system of oscillographs shown in Fig. 9 be employed, it is only necessary to adjust the axis of that one of the two mirrors 22 and 23 which moves the more rapidly in such manner that the component of the movement of the signal due to this mirror takes place in the field of view in a direction which is parallel to the direction of the vibrations which are imparted to the same signal by the pulsating or alternating currents in the circuit of the photo-electric element.

If the signal be indicated as described in the specification of the applicant's said prior patent by the action of a pencil of cathode rays upon a fluorescent screen 37ᵃ (Fig. 19) arranged in the field of view, and the displacements of the signal in the field of view be effected by the direct action of electromagnets 33 and 34, see Fig. 19, upon this pencil of cathode rays, then the axis of the electromagnet which produces the more rapid signal displacements must be set at right angles to the axis of the condenser 35 which sets the pencil of cathode rays vibrating under the influence of the photo-electrically produced currents. It is to be understood that the electromagnets 33 and 34 are energized by current transmitted by conductors 11 and 13 from the generators 3 and 4 of Fig. 5. When this method of signal indication is used it is possible, and herein is constituted a further improvement in telescopic apparatus of the kind in question, to dispense both with special conductors for the transmission of the photo-electric currents and with a separate signal indicating apparatus in connection with this circuit. Thus these currents can be sent into the conductors in which flow the currents which impart the more rapid movement to the signal in the field of view. In such case the corresponding current impulses received at any particular time are added together thus being equivalent to the addition of the movements which these currents would individually impart to the particular signal or to the signaling apparatus, that is to say, to the pencil of cathode rays or to the mirror of the corresponding oscillograph. This addition of the currents, instead of the addition of the movements produced by the same can be effected by direct or indirect connection of the corresponding conductors. Thus for example the conductors of the photo-electric signaling circuit may be joined directly or inductively to the conductors of the circuit of the generator 3, or a rheostat replacing it.

If the transmitting station is arranged as shown in Fig. 5, it is only necessary to connect the conductors 12 and 13 and to correspondingly remove the electromagnets 34 and the condenser 35 at the receiving station (Fig. 19). If however alternating currents are produced in the photo-electric circuit as shown in Fig. 12 or as shown in the alternative scheme illustrated in Fig. 15, the connection of this circuit to the conductor 12 may also be effected by means of a transformer, one winding of which is included in the bridge or shunt instead of the signaling apparatus 24, see Figs. 12, 15, and the other winding thereof is included in the transmitting line, which in Fig. 20 is indicated by the wire 12, the left end of which is shown as connected to earth.

In order to make use of the resonance phenomena for reducing the reactance when using alternating currents for the signal transmission, recourse is had in a manner which in itself is known, to a capacity 29 and a self induction coil 30, which are connected up in series or parallel according to whether it is required to make use of the voltage resonance in case of photo elements the action of which is based on the variation of the resistance on illumination or of the current strength resonance in case of photo elements the action of which is based upon the discharge of negative electricity. Fig. 17 illustrates by way of example a way of carrying out the scheme of connections according to Fig. 12, when using the earth as a current conductor.

From the foregoing explanation it is clear that by the action of an alternating current on the photo elements 20 and 21, an alternating current of a certain periodicity or frequency is set up in the conductor 12. If now in this alternating current circuit a local closed circuit containing capacity 29 and self-induction coil 30 be inserted at the receiving station, there is set up in this circuit 29, 30, when its periodicity corresponds to the frequency of said alternating current, a considerably stronger current than that in conductor 12, on account of the phenomenon of resonance. This current affects with correspondingly greater power the receiving apparatus 24, which may be, for example, a cathode ray tube. The capacity of this tube must naturally be taken into account in figuring the conditions for resonance.

Fig. 17 illustrates the use of voltage resonance; but the known phenomenon of current strength resonance can be employed for this purpose. The difference between the arrangement of Fig. 17 and that of Fig. 12 obviously consists merely in the fact that the resonance circuit is inserted in place of the receiving apparatus 24, while the receiving apparatus itself is arranged in the resonance circuit in series with the capacity 29 and induction coil 30.

In the determination of the resonance conditions it is obviously necessary to take into conjoint consideration the capacity and the self induction of the transmitting line. In other respects this arithmetical determination may be replaced by experimental adjustment by means of a variable capacity element and a self induction coil and the resonance conditions determined as in spark or wireless telegraphy from case to case by practical experiments. If for the purpose of increasing the sensitiveness of the transmission of the signals detectors likewise known in spark or wireless telegraphy be employed, then as shown in Fig. 18 a detector 37 can be used in place of the signaling apparatus 24 of Fig. 17, and this latter be included in the circuit of a local battery 32 which is in a branch of the detector circuit arranged in a suitable manner well known in spark or wireless telegraphy. In such case, when an alternating current flows in the resonance circuit, a direct current is set up in detector 37 and in receiving apparatus 24 (at the receiving station), which direct current produces a light signal in apparatus 24 which lasts as long as an alternating current exists in the resonance circuit. Of course the arrangement of Fig. 18 is applicable only when the receiving apparatus 24 can be operated by direct current, for example, when a cathode tube with diaphragm is employed, such as is described in English Patent 27570 of 1907.

It may be noted that in the arrangement illustrated in Fig. 18, the portion of conductor 12 shown at the left plays the part of the antenna of the receiving station in wireless telegraphy.

What I claim is:—

1. In the art of transmitting luminous pictures, the method which comprises progressively and in a determinate order directing, at the transmitting station, the rays from all the points of the picture to a photoelectric device in a transmitting circuit, producing by means of the said rays a vibratory electric current in said circuit whose impulses or pulsations are of uniform and very brief duration, and, at the receiving station, moving a light signal over a suitable field, and causing said vibratory electric current to vary the intensity of said light signal.

2. In the art of transmitting luminous pictures, the method which comprises progressively deflecting, at the transmitting station, the rays from all the points of the picture to a photo-electric device in a transmitting circuit, producing by means of the said rays a series of electric impulses in said circuit of uniform and very brief duration, and, at the receiving station, moving a light signal over a suitable field, and causing said electric impulses to vary the intensity of said light signal.

3. In the art of transmitting luminous pictures, the method which consists in progressively deflecting, at the transmitting station, the rays from all the points of the picture to a photo-electric device in a transmitting circuit, producing by means of the said rays alternating electric currents in said circuit of high and constant frequency and, at the receiving station, moving a light signal over a suitable field, and causing said alternating currents to vary the intensity of said light signal.

4. Apparatus for transmitting luminous pictures comprising the combination with a photo-electric device of means for progressively deflecting the luminous rays from the desired points of the picture field to the photo-electric device, and electric circuit controlled by said photo-electric device and means for causing the said luminous rays to produce in the said circuit a series of electric impulses or pulsations of uniform and very brief duration, means for transmitting said electric impulses to the receiving station and means, at this latter station, for moving a light signal over a suitable field, and means for causing said impulses to vary the intensity of said light signal.

5. Apparatus for transmitting luminous pictures comprising the combination with a photo-electric device, of means for progressively deflecting the luminous rays from the desired points of the picture field to the photo-electric device, an electric circuit controlled by said photo-electric device and means for causing the said luminous rays to produce alternating electric currents of high and constant frequency in said electric circuit, means for transmitting said electric currents to the receiving station and, at this latter station, means for moving a light signal over a suitable field and means for causing said currents to vary the intensity of said light signal.

6. Apparatus for transmitting luminous pictures comprising the combination with a photo-electric device, of means for progressively deflecting the luminous rays from the desired points of the picture field to the photo-electric device, a tuned electric circuit controlled by said photo-electric device and means for causing the said luminous rays to produce in the said circuit a series of electric impulses or pulsations of constant and very brief duration, means for transmitting said electric impulses to the receiving station and means, at this latter station, for moving a light signal over a suitable field, and means for causing said impulses to vary the intensity of said light signal.

7. Apparatus for transmitting luminous pictures comprising the combination with a photo-electric device at the sending station, of rotatable means for deflecting luminous rays from the picture field to the photo-electric device, an electric circuit controlled by said photo-electric device, means for insuring that the current in said circuit shall consist of impulses of brief and substantially constant duration, electric circuit means coöperating with said rotatable means and arranged to deliver electric currents to the receiving station, means for utilizing the last named currents at the receiving station to move a luminous signal over a suitable field, and means for varying the intensity of such luminous signal through the agency of said current in the photo-electric circuit and thereby reproducing the original picture.

8. Apparatus for transmitting luminous pictures comprising the combination with a photo-electric device at the sending station, of means for progressively deflecting luminous rays from the desired points of the picture field to said device, means for dividing such deflected rays into elementary light signals of very brief and substantially uniform duration, an electric circuit controlled by said photo-electric device, an electric circuit coöperating with the ray-deflecting means aforesaid and arranged to deliver synchronous electric currents to the receiving station, means for utilizing said synchronous currents at the receiving station to move a luminous signal over a suitable field, and means for varying the intensity of such luminous signal through the agency of the current in the photo-electric circuit and thereby reproducing the original picture.

9. Apparatus for transmitting luminous pictures comprising the combination with a photo-electric device at the sending station, of means for progressively deflecting luminous rays from the desired points of the picture field to said device, an electric circuit controlled by said photo-electric device, means for splitting the currents produced in the said circuit into distinct elementary impulses of very brief and uniform duration, an electric circuit coöperating with the ray deflecting means aforesaid and arranged to deliver synchronous electric currents to the receiving station, means for utilizing said synchronous currents at the receiving station to move a luminous signal over a suitable field, and means for varying the intensity of such luminous signal through the agency of the current in the photo-electric circuit and thereby reproducing the original picture.

10. Apparatus for transmitting luminous pictures comprising the combination with means, including a suitable circuit for producing an electric current whose strength is proportional to intensity of illumination and which consists of series of impulses of very brief and substantially equal duration, of a movable device for progressively deflecting luminous rays from the picture field to said means, an electric circuit coöperating with said device and arranged to transmit electric currents synchronous with the movements thereof, and means for impressing currents from both said circuits upon a luminous signal at the receiving station.

In testimony whereof I hereunto affix my signature in the presence of two witnesses.

BORIS ROSING.

Witnesses:
WILLIAM STEININGER,
H. A. LOVIAGUINE.